Jan. 2, 1945.  E. D. JOHNSON  2,366,192
CONTROL VALVE MECHANISM
Filed Dec. 3, 1942  2 Sheets-Sheet 1

INVENTOR
E. D. JOHNSON

Jan. 2, 1945.  E. D. JOHNSON  2,366,192
CONTROL VALVE MECHANISM
Filed Dec. 3, 1942  2 Sheets-Sheet 2
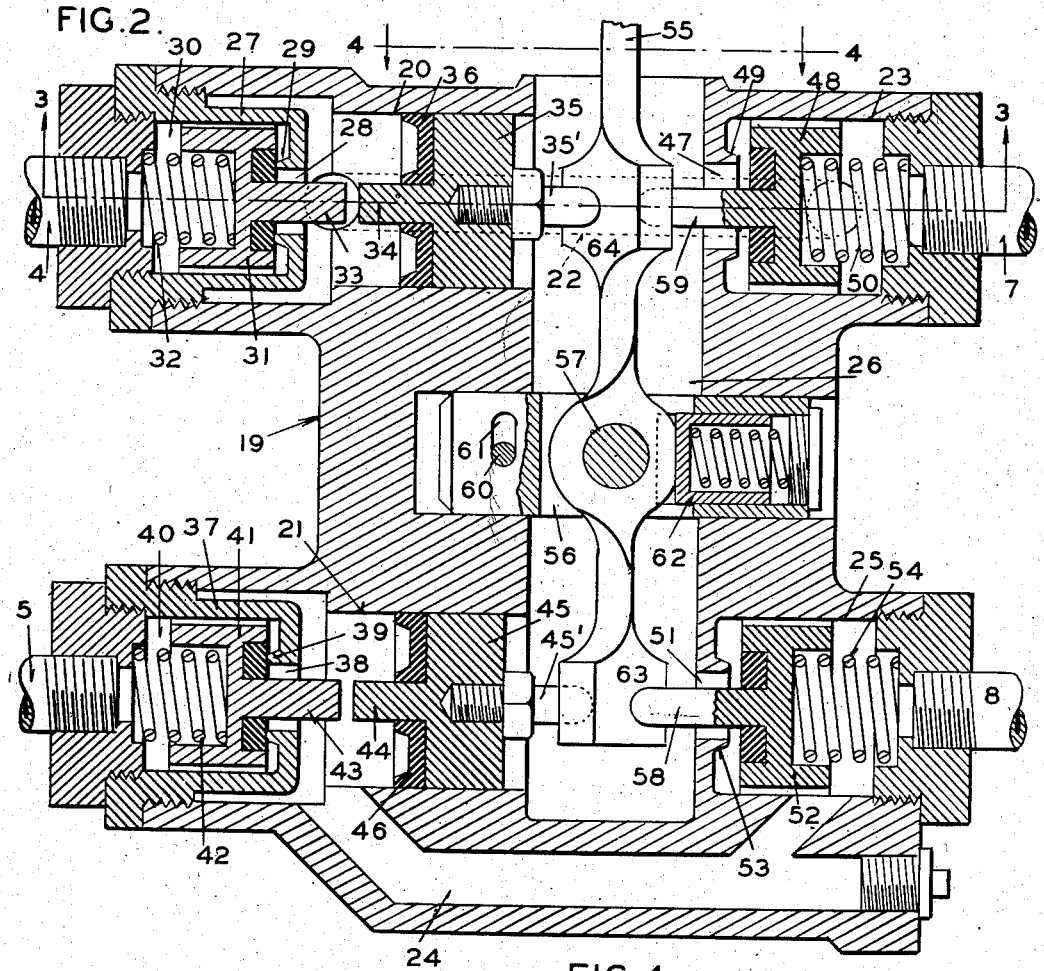
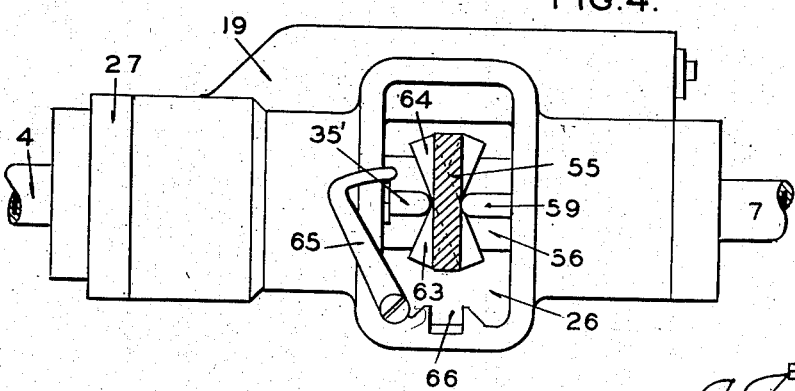
INVENTOR
E. D. JOHNSON
BY
ATTORNEY Patented Jan. 2, 1945

2,366,192

UNITED STATES PATENT OFFICE 2,366,192

CONTROL VALVE MECHANISM

Edward D. Johnson, Detroit, Mich., assignor to Wagner Electric Corporation, St. Louis, Mo., a corporation of Delaware Application December 3, 1942, Serial No. 467,742

6 Claims. (Cl. 303—6)

My invention relates to valve mechanism and more particularly to an improved valve mechanism for controlling fluid pressure to a plurality of actuating devices.

One of the objects of my invention is to provide an improved control valve mechanism for permitting either selective or simultaneous operation of fluid pressure-actuated devices by the manipulation of a single control lever.

A more specific object of my invention is to provide a single lever control for two fluid pressure valves whereby the valves may be selectively controlled by a movement of the lever in opposite directions from a central position to thereby selectively place two devices to be actuated in communication with a source of fluid pressure or simultaneously controlled by movement of the lever in another direction in order to place the source of fluid pressure in communication with both of said devices.

Figure 1:
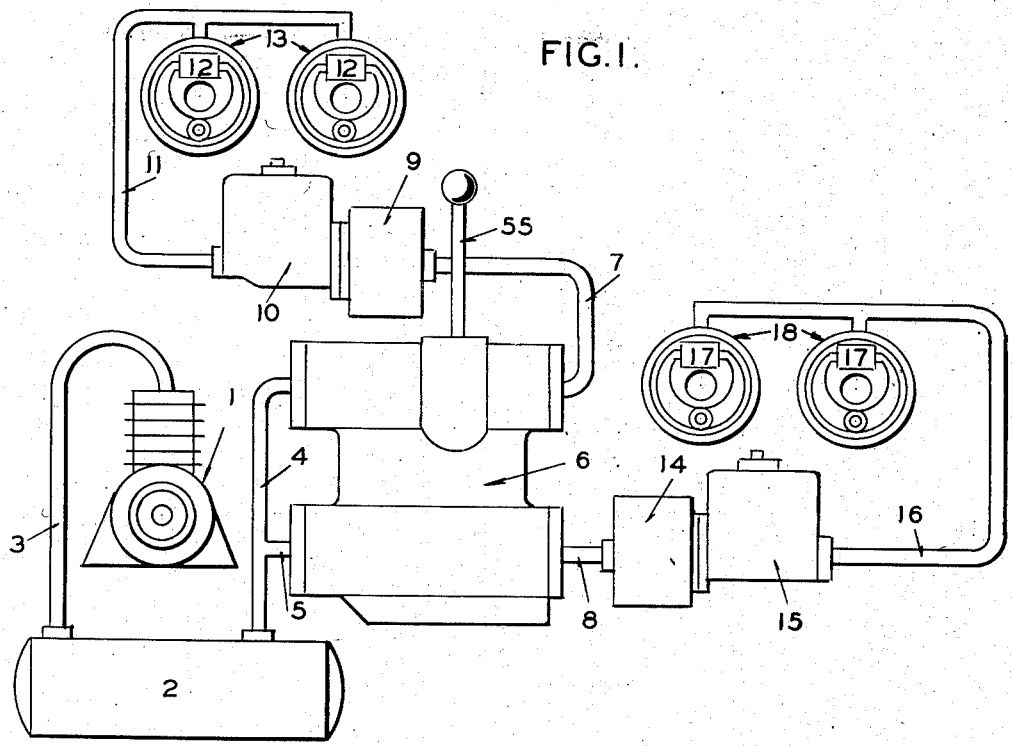
Figure 3:
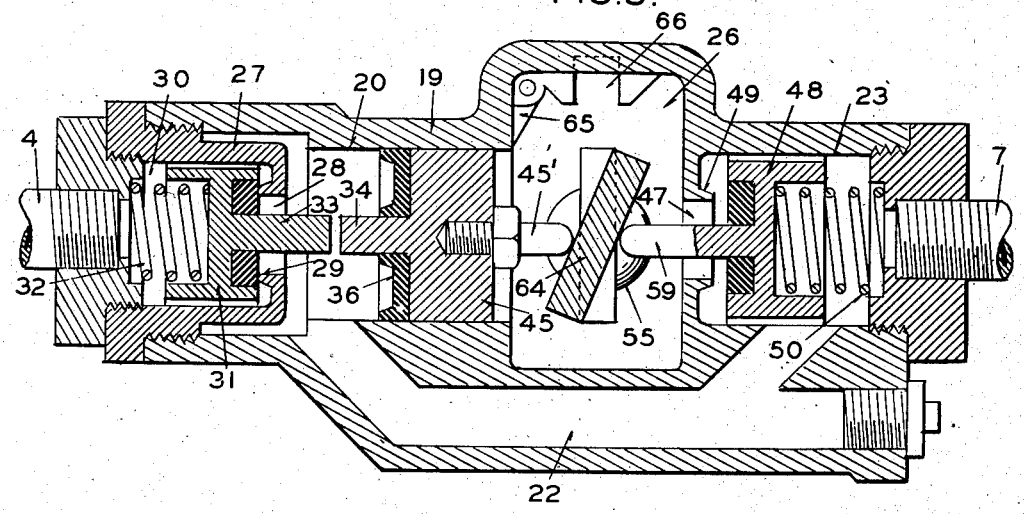

Other objects of my invention will become apparent from the following description taken in connection with the accompanying drawings in which Figure 1 is a schematic view of a fluid pressure system having my control valve mechanism embodied therein; Figure 2 is a longitudinal sectional view showing details; Figure 3 is a sectional view taken on the line 3—3 of Figure 2; and Figure 4 is a top view as viewed from the line 4—4 of Figure 2.

Referring first to Figure 1, there is schematically shown a fluid pressure actuating system designed primarily for controlling the brakes of a vehicle and enabling the operator to so operate the brakes that they can be employed to aid in steering although it is to be understood that the same system may be employed for actuating other devices besides brakes. Numeral 1 indicates an air compressor which is connected to a reservoir or storage tank 2 by a conduit 3 in order that compressed air may be stored for use in operating the brakes. Conduits 4 and 5 connect the tank with my improved valve mechanism generally indicated by the numeral 6, which valve mechanism is capable of so controlling the fluid pressure from the tank that it can flow to conduits 7 and 8 either selectively or simultaneously. The conduit 7 leads to a power cylinder 9 for actuating a hydraulic master cylinder 10 having its outlet connected by a conduit 11 with the fluid motors 12 of the brake assemblies 13 on the left hand wheels of the vehicle. The conduit 8 leads to a power cylinder 14 which actuates the master cylinder 15 having its outlet connected by a conduit 16 to the fluid motors 17 for operating the brake assemblies 18 on the right hand wheels of the vehicle.

Referring now to Figures 2, 3, and 4, the details of the valve mechanism 6 will be described. The parts of the valve mechanism are incorporated in a casing 19 having parallel bores 20 and 21. The bore 20 communicates by a passage 22 with a bore 23 axially aligned with said bore 20. Similarly bore 21 communicates by a passage 24 with a bore 25 axially aligned with said bore 21. The casing is formed with a chamber 26 open at the top and lying between bores 20 and 23 and between bores 21 and 25.

The outer end of bore 20 receives a cup-shaped member 27 having an opening 28 surrounded by a valve seat 29. Connected to this cup-shaped member is conduit 4 whereby fluid from the source can enter the chamber 30 formed by the cup-shaped member. Associated with valve seat 29 is a valve element 31 for controlling opening 28, said valve element being biased toward a seated position by a spring 32. The valve element has a stem 33 projecting through opening 28 in order to be engaged by a stem 34 on a reaction piston 35 mounted in bore 20 and sealed by a cup 36.

In a similar manner the outer end of bore 21 receives a cup-shaped member 37 having an opening 38 surrounded by a valve seat 39. Connected to this cup-shaped member is conduit 5 whereby fluid from the source can enter chamber 40 formed by the cup-shaped member. Associated with valve seat 39 is a valve element 41 for controlling the opening 38, said valve element being biased toward a seated position by a spring 42. The valve element has a stem 43 projecting through opening 38 in order to be engaged by a stem 44 on a reaction piston 45 mounted in bore 21 and sealed by a cup 46.

The outer end of bore 23 is connected to conduit 7 and the outer end of bore 25 is connected to conduit 8. It is seen that by this arrangement when valve element 31 is unseated to permit fluid pressure from the source to pass through opening 28, this fluid under pressure can flow through passage 22 directly to conduit 7 and thereby actuate power cylinder 9 to cause the master cylinder device to apply the brakes on the left wheels. When the valve element 41 is unseated, fluid under pressure can flow from the source through opening 38, passage 24 directly to conduit 8 and power cylinder 14 to cause the master cylinder 15 to apply the brakes on the right wheels.

The inner end of bore 23 communicates with chamber 26 and the atmosphere by an opening 47, which opening is controlled by an exhaust valve element 48 cooperating with a seat 49 surrounding opening 47. A spring 50 biases valve element 48 toward seated position. In a like manner the inner end of bore 25 communicates with chamber 26 and the atmosphere by an opening 51 which is controlled by a valve element 52 cooperating with a seat 53 surrounding the opening. A spring 54 biases valve element 52 toward closed position.

A lever 55 has its lower end portion positioned in chamber 26 and pivotally mounted on a shaft 56 by a pin 57, said shaft axis being parallel with the axes of the bores and lying between bores 20 and 21. The lower end of the lever below pivot pin 57 projects between an adjustable stem 45' on piston 45 and a stem 58 on the exhaust valve element 52. The portion of the lever above the pivot pin is positioned between an adjustable stem 35' on piston 35 and a stem 59 carried by the exhaust valve element 48. Shaft 56 is prevented from longitudinal movement by a pin 60 positioned in a slot 61, said slot being arranged to permit limited rotation of the shaft when the lever is moved toward the operator, as viewed in Figure 2. The shaft also carries a spring-pressed plunger 62 for biasing the lever in a vertical position and when in this position, both exhaust valve elements will be held open.

By this arrangement if the upper end of lever 55 is moved to the right by the operator, as viewed in Figure 2, the lever will swing about pivot 57 and the lower end will move piston 45 to the left and open valve element 41, thereby admitting fluid under pressure to operate the right wheel brakes. Valve element 41 will not be opened until exhaust valve element 52 becomes closed as piston 45 has limited free travel before its stem 44 engages stem 43 of the valve element. As air passes through opening 38 it will become effective on piston 45 to produce a reaction on the lever to thus give the operator a "feel." After sufficient air pressure is permitted to flow to the power cylinder to obtain the desired braking action, valve element 41 is permitted to close by allowing the lever to return toward vertical position but not sufficiently to open exhaust valve element 52. To release the air pressure, the lever is returned in order to open the exhaust valve element. When the upper end of lever 55 is moved to the left, valve element 31 will be opened and the left brakes will be applied. When the desired braking action has been obtained, valve element 31 is permitted to close by allowing the lever to return toward its vertical position. The piston 35 produces a "feel" for the operator. The exhaust valve element 52 will be closed before valve element 31 is open. The air pressure is released when the lever is again brought to vertical position as the exhaust valve element 48 will then be opened.

The lower end of the lever, which cooperates with piston stem 45' and stem 58, is formed to provide a cam 63 which is so arranged that when the upper end of the lever is swung toward the operator, as viewed in Figure 2, inlet valve element 41 will be opened and exhaust valve element 52 will become closed. In a like manner the portion of the lever which cooperates with piston stem 35' and stem 59 is also formed to provide a cam 64 whereby when the lever is swung toward the operator, inlet valve element 31 will also be opened and the exhaust valve element 48 permitted to be closed. Thus it is seen that by swinging the lever about the axis of shaft 56, both inlet valve elements 31 and 41 are opened and fluid under pressure flows to both power cylinders 9 and 14 to simultaneously apply the brakes on both sides of the vehicle.

Since it may be desired to maintain all the brakes applied and held so without manual effort, a latch 65 is provided for holding the lever in its laterally shifted position. A notch 66 cooperates with the lever in latched position for preventing any shifting of the lever about its pivot 57.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In valve mechanism for controlling the flow of fluid under pressure from a source of fluid pressure to two motors, said mechanism comprising axially aligned inlet and exhaust valve elements for one motor, axially aligned inlet and exhaust valves for the other motor, a lever pivoted intermediate its ends and having a portion on one side of its pivot for controlling one set of inlet and exhaust valve elements and another portion on the other side of the pivot for controlling the other set of inlet and exhaust valve elements, said lever being so associated with the valve elements that a movement in one direction about its pivot will open one inlet valve element of one set of valve elements and maintain the exhaust valve element of the other set open and a movement in the other direction will open the other inlet valve element and maintain the other exhaust valve element open.

2. In valve mechanism for controlling the flow of fluid under pressure from a source of fluid pressure to two motors, said mechanism comprising axially aligned inlet and exhaust valve elements for one motor, axially aligned inlet and exhaust valves for the other motor, a lever pivoted intermediate its ends and having a portion on one side of its pivot for controlling one set of inlet and exhaust valve elements and another portion on the other side of its pivot for controlling the other set of inlet and exhaust valve elements, said lever being so associated with the valve elements that a movement in one direction about its pivot will open one inlet valve element of one set of valve elements and maintain the exhaust valve element of the other set open and a movement in the other direction will open the other inlet valve element and maintain the other exhaust valve element open, and means operable by a movement of the lever in another direction for opening both inlet valve elements and permitting the exhaust valve elements to be closed.

3. In valve mechanism for controlling the flow of fluid under pressure from a source of fluid pressure to two motors, said mechanism comprising axially aligned inlet and exhaust valve elements for one motor, axially aligned inlet and exhaust valves for the other motor, a lever pivoted intermediate its ends and having a portion on one side of its pivot for controlling one set of inlet and exhaust valve elements and another portion on the other side of its pivot for controlling the other set of inlet and exhaust valve elements, said lever being so associated with the valve elements that a movement in one direction about its pivot will open one inlet valve element of one set of valve elements and maintain the exhaust valve element of the other set open and a movement in the other direction will open the other inlet valve element and maintain the other exhaust valve element open, means for permitting the lever to move in a plane at right angles to the axis of its pivot, and cam means on the lever on opposite sides of its pivot for opening both inlet valve elements and permitting the closing of both exhaust valve elements when the lever is moved in the right angle plane.

4. In valve mechanism for controlling the flow of fluid under pressure from a source of fluid pressure to two motors, said mechanism comprising two inlet valve elements positioned for movement on parallel axes, a lever pivotally mounted intermediate its ends on an axis positioned between and at right angles to the axes of the valve elements, said lever being so operatively associated with the valve elements that a movement in one direction on its pivot will open one valve element only and a movement in the opposite direction will open the other valve element only, means for mounting the lever pivot so as to permit movement of the lever on an axis parallel with the valve element axes, and means comprising cams carried by the lever on opposite sides of its pivot for opening both valve elements when the lever is pivoted on said last named axis.

5. In a fluid pressure system, a source of pressure different from atmosphere, two motors, conduit means between the source and one motor, other conduit means between the source and the other motor, a valve for controlling the flow of fluid through each conduit and having a movable control element, a lever pivoted intermediate its ends, said lever having on its body portions at opposite sides of said pivot cam surfaces each of which is capable of engaging the element of a valve so that movement of the lever in opposite directions about its pivot axis will selectively operate the valves, and means for mounting said lever pivot so as to permit movement of the lever about an axis at right angles to the axis of said intermediate pivot, said cam surfaces on opposite sides of the pivot being so arranged on the lever that when said lever is rotated about the right angle axis to move one cam surface relatively in one direction to its control element and the other cam surface relatively in the opposite direction to its control element the cam surfaces will simultaneously move the control elements and thereby simultaneously operate the valves.

6. In a fluid pressure system, a source of pressure different from atmosphere, two motors, conduit means between the source and one motor, other conduit means between the source and the other motor, a valve for controlling the flow of fluid through each conduit means, a reciprocable operating stem for each valve, said stems being mounted in spaced parallel relation, a lever, a pivot pin for pivotally mounting the intermediate portion of the lever between the axis of the stems, said lever being provided on opposite sides of its pivot with flat surfaces each of which is capable of engaging a stem so that movement of the lever in opposite directions about the pivot pin axis will selectively operate the valves, and means for mounting said lever pivot pin so as to permit movement of the lever about an axis at right angles to the axis of the pin, said flat surfaces on opposite sides of the pivot pin being so angularly related with respect to each other and the pivot pin axis that the stems can be simultaneously operated by relative movement of the surfaces to the stems when the lever is rotated about the right angle axis and thereby simultaneously operate the valves.

EDWARD D. JOHNSON.